(12) United States Patent
Waltman

(10) Patent No.: US 6,484,625 B2
(45) Date of Patent: Nov. 26, 2002

(54) ROTISSERIE MOTOR MOUNTING DEVICE

(76) Inventor: John H. Waltman, 3336 Bald Mountain Rd., Auburn Hills, MI (US) 48326

(*) Notice: Subject to any disclaimer, the term of this patent is extended or adjusted under 35 U.S.C. 154(b) by 0 days.

(21) Appl. No.: 09/797,292

(22) Filed: Mar. 1, 2001

(65) Prior Publication Data

US 2002/0121199 A1 Sep. 5, 2002

(51) Int. Cl.[7] ............................................. A47J 37/00
(52) U.S. Cl. ........................ 99/421 HH; 99/427; 99/419
(58) Field of Search .................... 99/427, 340, 339, 99/450, 449, 447, 401, 402, 443 R, 421 H, 421 HH, 421 HV, 419

(56) References Cited

U.S. PATENT DOCUMENTS

| | | |
|---|---|---|
| 1,899,335 A | 2/1933 | Kastner |
| 1,993,607 A | 3/1935 | Kalgren |
| 2,839,989 A | 6/1958 | Persinger |
| 2,938,450 A | 5/1960 | Carpenter et al. |
| 3,103,161 A | 9/1963 | Whitehead |
| 3,147,690 A | 9/1964 | Smith |
| 3,486,200 A | 12/1969 | Orenick |
| 3,563,159 A | 2/1971 | Johnson ..................... 99/339 |
| 3,797,379 A | 3/1974 | Brion ..................... 99/421 H |
| 3,875,620 A | 4/1975 | Wells et al. |
| 4,369,697 A | 1/1983 | Millington ................. 99/351 |
| 4,421,017 A | 12/1983 | Ross ....................... 99/421 R |
| 4,442,762 A * | 4/1984 | Beller ....................... 99/427 |
| 4,442,763 A * | 4/1984 | Beller ....................... 99/427 |
| 4,505,195 A | 3/1985 | Waltman ..................... 99/427 |
| 4,593,613 A | 6/1986 | Waltman ..................... 99/427 |
| 4,679,543 A | 7/1987 | Waltman et al. ........... 126/25 R |
| 4,688,477 A | 8/1987 | Waltman ..................... 99/427 |
| 4,787,302 A | 11/1988 | Waltman et al. ............. 99/427 |
| 4,982,657 A | 1/1991 | Ghenic ..................... 99/421 A |
| 5,421,318 A | 6/1995 | Unruh et al. .......... 99/421 H X |
| 5,485,780 A | 1/1996 | Koether et al. ............... 99/419 |
| 5,562,022 A | 10/1996 | Schmid et al. ............ 99/421 H |
| 5,715,744 A | 2/1998 | Coutant ................... 99/421 H |
| 5,799,569 A | 9/1998 | Moreth ..................... 99/421 H |
| 5,819,639 A | 10/1998 | Spell ....................... 99/421 A |
| 5,887,513 A | 3/1999 | Fielding et al. ........... 99/421 A |

* cited by examiner

Primary Examiner—Reginald L. Alexander
(74) Attorney, Agent, or Firm—Young & Basile, PC

(57) ABSTRACT

The rotisserie motor mounting device for releasably connecting a motor housing having a motor therein to a rotisserie is disclosed. The rotisserie motor mounting device has a shaft extending from one of the rotisserie and a free end selectively connectible to the motor. The rotisserie motor mounting device further includes a support shaft which is releasably connectible to a portion of the rotisserie at one end and the motor housing at the other end. The support shaft has a pair of interconnecting shaft portions which can be adjusted to provide more than one length for the support shaft. One end of each interconnecting shaft portion is connected to a planar configuration. Each planar configuration is slidably attachable within sleeves to the rotisserie and the motor housing.

11 Claims, 2 Drawing Sheets

ROTISSERIE MOTOR MOUNTING DEVICE

FIELD OF THE INVENTION

This invention relates to rotisseries and in particular to a rotisserie motor mounting device which releasably connects a motor to the rotisserie.

BACKGROUND OF THE INVENTION

In the prior art, food such as meat or vegetables to be grilled are generally placed on a spit which is rotatable to expose the food to the heat in order to ensure uniform cooking of the same. It is a convenience for the cook to have the spit mechanically or electrically revolve, rather than manually revolve, over the heat to ensure even and thorough grilling of the food. The mechanical or electrical revolution of the spit allows the cook to prepare other portions of the meal while the food is cooking.

It is well known to provide grills wherein the rotisserie portion can be attached to electrical motor equipment to revolve the spit. In these cases, the motor equipment is fixedly connected to the grill, so that one end of the spit with the food speared thereon can be inserted into the electrical motor equipment while being held over the source of heat. Because the motor equipment is fixed on the grill relative to the source of heat, the spit must be angled to insert the end of the spit into the motor equipment over a hot flame or coals. In addition, the tilting action of the spit may cause some loss of food into the fire.

Therefore, it would be advantageous to provide a device or apparatus that allows the cook to mount the spit into the motor equipment without concern of burning oneself or losing food into the fire. At the same time, it would be advantageous to provide a device or apparatus that allows the motor equipment to be selectively removable from the grill as well as selectively positionable relative to the grill when attached thereon.

SUMMARY OF THE INVENTION

It is the intent of the present invention to address the aforementioned concerns. The present invention provides a rotisserie motor mounting device which is releasably connectible to a motor housing having a motor located inside and to a rotisserie via a support base. The rotisserie has a cradle supported by end plates. The rotisserie motor mounting device has a support column extending from one of the end plates of the rotisserie and having a free end releasably mounted to the motor. The rotisserie motor mounting device further includes a motor support having a first end mountable to the support base for the rotisserie and a second end mountable to the motor housing.

In another aspect of the invention, the motor support has at least two selectable lengths.

In yet another aspect of the invention, a first end of the motor support has a planar configuration slidably mountable to a first sleeve secured on a support stand and a second end of the motor support has a second planar configuration slidably mountable to a second sleeve secured on the motor housing.

In a further aspect of the invention, hollow, non-circular shafts extend from each planar configuration of the motor support. Each hollow, non-circular shaft has the same configuration and one of the hollow, non-circular shafts is slightly larger than the other hollow, non-circular shaft for receiving the first hollow, non-circular shaft therein. The hollow, non-circular shafts include locking means for selectively and releasably securing the hollow, non-circular shafts together at a predetermined length.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
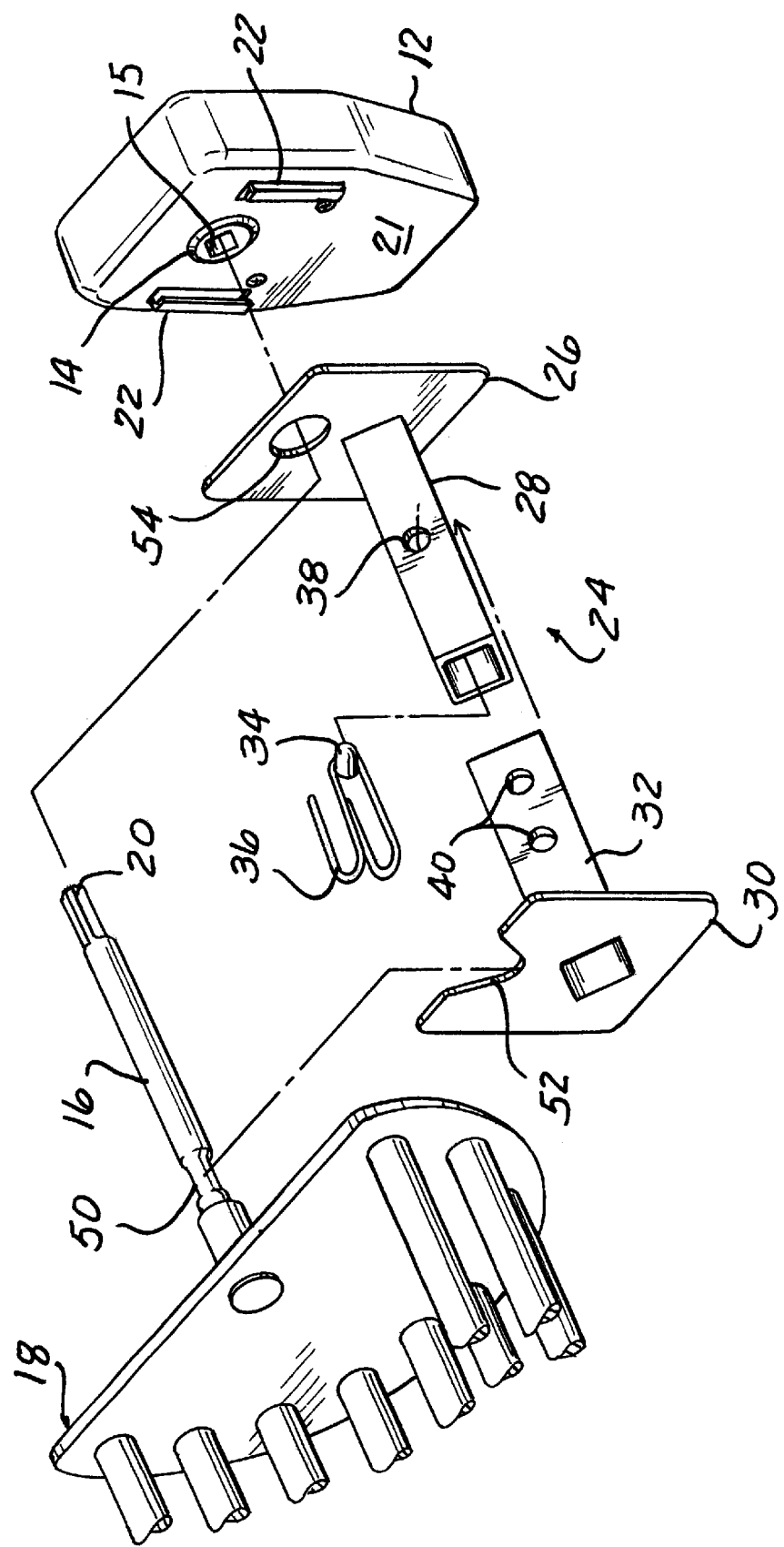
FIG. 1 is an exploded view of the rotisserie motor mounting device according to the present invention.

Referring to the Figures and especially FIG. 1, there is illustrated a rotisserie motor mounting device for connecting a motor housing having a motor therein to a rotisserie. A motor (not shown) is positioned within a motor housing 12. The motor housing 12 also houses a supply source such as batteries for a portable rotisserie or an outlet for connection to an electrical source. The motor revolves a female turnkey 14. The female turnkey 14 has an aperture 15 for receiving a support column 16 attached to a rotisserie 18. The aperture 15 of the female turnkey 14 and a free end 20 of the support column 16 each have a squared configuration or other non-circular formation to prevent the support column 16 from slipping as the free end 20 is revolved within the female turnkey 14. On the inner surface 21 of the motor housing 12 and positioned adjacent to the female turnkey 14 are a pair of opposing sleeves 22. The sleeves 22 are positioned for accepting one end of the motor support 24 as will be discussed further.

The motor support 24 essentially includes two parts that can be connected and locked together at various predetermined lengths to accommodate the environment of the rotisserie 18 and motor housing 12. The motor support 24 has a first planar plate 26 having a hollow, non-circular shaft 28 extending therefrom. The motor support 24 has a second planar plate 30 having a second hollow, non-circular shaft 32 extending therefrom. The first and second hollow, non-circular shafts, 28 and 32 respectively have the same configuration. One of the first and second hollow, non-circular shafts 28 or 32 is slightly smaller than the other hollow, non-circular shaft so that the smaller, hollow, non-circular shaft can be received within the slightly larger, hollow, non-circular shaft.

As illustrated in FIG. 1, the larger, hollow, non-circular shaft is designated as 32 while the smaller, hollow, non-circular shaft is designated as 28. This is arbitrary and could be reversed. However, the smaller, hollow, non-circular shaft 28 includes retractable pin 34 held within the hollow, non-circular shaft 28 by means of a spring tension 36. The retractable pin 34 is exposed to the exterior of the hollow, non-circular shaft 28 through aperture 38 located in a wall of the hollow, non-circular shaft 28. The larger, hollow, non-circular shaft designated as 32 in FIG. 1 has at least two through apertures 40 positioned adjacent to each other through a wall of the hollow, non-circular shaft 32 and positioned to correspond with the location of the aperture 38. The length of the shaft when the two hollow, non-circular shafts are joined can be predetermined by selectively exposing pin 34 through one of the apertures 40.

Figure 2:
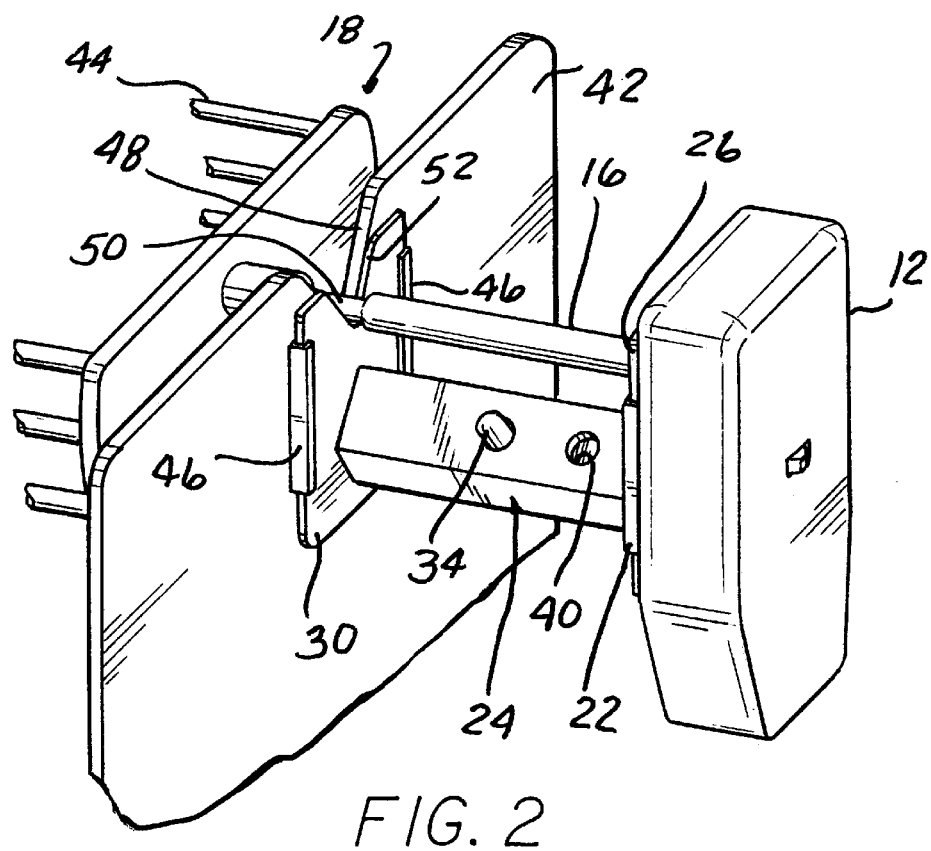
FIG. 2 is a perspective view of the motor mounted to the rotisserie by means of the rotisserie motor mounting device.
Figure 3:
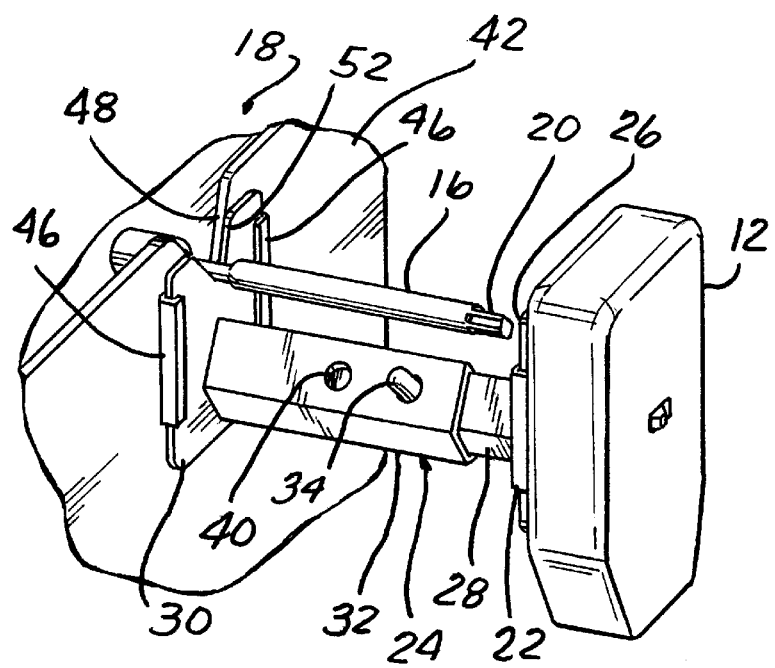
FIG. 3 is a perspective view of the motor disconnected to the rotisserie.

Looking at FIGS. 2 and 3, there is shown an end plate 42 of a rotisserie support. The rotisserie support may be a grill or a stand-alone support which holds the rotisserie cradle 44 above the source of heat. A second pair of opposing sleeves 46 are positioned on an outside wall of the end plate 42 of the rotisserie support. The first pair of opposing sleeves 22 and the second pair of opposing sleeves 46 are configured to form U-shaped channels so that the first and second planar plates 26, 30 respectively are slidably received therein.

The upper portions of each of the first and second planar plates 26 and 30 respectively are configured for receiving a portion of the support column 16 extending from the rotisserie 18. The rotisserie support 42, whether configured as a stand-alone base or as part of a grill generally has a grooved upper portion 48 for laying a portion of the support column 16 therein. The support column 16 may have a portion with a smaller radius 50 for placement within groove 48. Likewise, second planar plate 30 has a corresponding groove 52 for placement adjacent the groove 48 and for supporting portion 50 of the support column 16.

First planar plate 26 is received within opposing sleeves 22 on the motor housing 14 similarly to that of the second planar plate 30 within opposing sleeves 46. The upper portion of the first planar plate 26, best seen in FIG. 1, has a through aperture 54 positioned to correspond with the female turnkey 14 when the first planar plate 26 is slidably received within opposing sleeves 22. Through aperture 54 in the first planar plate 26 allows access of the support column 16 to the female turnkey 14 in the motor housing 12.

FIGS. 2 and 3 show the support column 16 connected to the motor housing 12 and disconnected to the motor housing 12 respectively. The advantages of this configuration is that the position of the motor housing 12 relative to the rotisserie 18 is adjustable. Further, connection of the rotisserie 18 to the motor housing 12 is easier because the support column 16 is removable from the motor housing 12. In addition, the motor support 24 is not a fixed unit, but is releasably connectible to both the rotisserie support 42 and the motor housing 12 as well as having an adjustable length.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A rotisserie motor mounting device for releasably connecting a motor housing having a motor therein to a rotisserie, said rotisserie having a cradle supported by two end plates wherein said rotisserie is supported on a support base, said device comprising:
    a shaft extending from one end plate of the rotisserie, said shaft having a free end releasably mounted to the motor; and
    a motor support having a first end mountable to the support base of the rotisserie and a second end mountable to the motor housing, wherein the motor support has at least two selectable lengths.

2. The mounting device of claim 1, wherein the shaft is fixedly secured to the one end plate of the rotisserie.

3. The mounting device of claim 1, wherein the motor housing has a non-circular access to the motor and the free end has a non-circular end for disposition into the non-circular access.

4. A rotisserie motor mounting device for releasably connecting a motor housing having a motor therein to a rotisserie, said rotisserie having a cradle supported by two end plates wherein said rotisserie is supported on a support base, said device comprising:
    a shaft extending from one end plate of the rotisserie, said shaft having a free end releasably mounted to the motor; and
    a motor support having a first end mountable to the support base of the rotisserie and a second end mountable to the motor housing, wherein the first end of the motor support has a first planar configuration slidably mountable to a first sleeve secured on the support base and the second end of the motor support has a second planar configuration slidably mountable to a second sleeve secured on the motor housing.

5. The mounting device of claim 4, wherein the motor support has at least two selectable lengths.

6. The mounting device of claim 4, wherein the first planar configuration of the first end of the motor support has a notch formed in the upper peripheral surface for receiving a portion of the shaft.

7. The mounting device of claim 6, wherein the second planar configuration of the second end of the motor support has a through aperture for receiving another portion of the shaft.

8. The mounting device of claim 7, wherein each planar configuration has a hollow non-circular shaft extending therefrom.

9. The mounting device of claim 8, wherein each hollow non-circular shaft has the same configuration and one of the hollow non-circular shafts is slightly larger than the other hollow non-circular shaft for receiving said other hollow non-circular shaft therein.

10. The mounting device of claim 9, wherein the hollow non-circular shafts including locking means for selectively and releasably securing the hollow non-circular shafts together at a predetermined length.

11. The mounting device of claim 4, wherein the first and second sleeves are integral with the motor housing.

* * * * *